United States Patent

Hallier

Patent Number: 6,028,839
Date of Patent: Feb. 22, 2000

[54] PROCESS FOR THE JOINT USE OF A TIMER-MULTIPLEX TRANSMISSION CHANNEL BY PLURALITY OF TRANSMITTERS

[75] Inventor: Juergen Hallier, Holle, Germany

[73] Assignee: Robert Bosch GmbH, Stuttgart, Germany

[21] Appl. No.: 08/913,009

[22] PCT Filed: Nov. 25, 1996

[86] PCT No.: PCT/DE96/02258

§ 371 Date: Dec. 11, 1997

§ 102(e) Date: Dec. 11, 1997

[87] PCT Pub. No.: WO97/25791

PCT Pub. Date: Jul. 17, 1997

[30] Foreign Application Priority Data

Jan. 4, 1996 [DE] Germany ............ 196 00 177

[51] Int. Cl.[7] ........................................ G06F 11/00
[52] U.S. Cl. ............................ 370/230; 370/465
[58] Field of Search .................... 370/230, 231, 370/232, 233, 234, 235, 236, 468, 395, 465; 395/200.62

[56] References Cited

U.S. PATENT DOCUMENTS

| | | | |
|---|---|---|---|
| 4,365,296 | 12/1982 | Ulmer | 370/538 |
| 5,509,013 | 4/1996 | Adachi et al. | 370/538 |
| 5,862,237 | 1/1999 | Gray | 395/200.62 |

OTHER PUBLICATIONS

Eureka 147–DAB II, document WGT3–93.14a.

Thomas Wachter, Telekom's Expectations of the Requirements on the DAB–Multiplex and the Contribution and Distribution Concepts in Germany, Generldirektion Telekom (Eureka 147–DAB II, document WGT3–93.14a).

*Primary Examiner*—Alpus H. Hsu
*Assistant Examiner*—Afsar M. Qureshi
*Attorney, Agent, or Firm*—Kenyon & Kenyon

[57] ABSTRACT

A process for transmitting data from a transmitter to at least one receiver making it possible for the data sources to distribute the total transmission capacity allocated to them, on their own and without regard for other sources, to different data streams. No agreement with the transmitting equipment is necessary, so that "virtual system operation" is possible from the standpoint of the data sources.

4 Claims, 2 Drawing Sheets

6,028,839

PROCESS FOR THE JOINT USE OF A TIMER-MULTIPLEX TRANSMISSION CHANNEL BY PLURALITY OF TRANSMITTERS

FIELD OF THE INVENTION

The present invention relates to a method for transmitting data from a transmitter to at least one receiver.

BACKGROUND INFORMATION

Broad-band digital broadcast systems such as digital audio broadcasting (DAB) offer the possibility of multiplexed transmission of multiple programs and/or data services because of their high data rate. The distribution of the total capacity among the individual programs can be varied during operation (dynamic reconfigurability). A flexible distribution of the total transmission capacity allocated to the various program providers by a system operator is described in the publication *Eureka* 147-*DAB II,* document WGT3-93.14a (Th. Wächter, Deutsche Bundespost Telecom), where the program providers can distribute the total capacity allocated to them among various programs or data services on their own as desired without regard for other program providers. This is called "virtual system operation." However, no implementation is proposed.

SUMMARY OF THE INVENTION

The process according to the present invention permits "virtual system operation," i.e., the fixed data throughput allocation of a source can be distributed by the source on its own to multiple data streams without regard for other possible sources. Changes can be made in data throughputs of individual data streams of a source without requiring synchronization among the sources or between the transmitter and the sources. This yields the additional advantages that no return lines from the transmitter to the sources are needed, and furthermore, no agreement need be reached among the sources.

One embodiment of the present invention relates to boundary conditions that permit optimum utilization of the available transmission capacity due to the fact that the reduction in data throughput of one data stream is made possible at the latest possible time and the increase in data throughput of another data stream is possible at the earliest possible time.

Through the improvements on the process according to the present invention the time sequences in "virtual system operation" can be further optimized so that the total data throughput available to each source can be utilized optimally and unnecessary delays in reconfiguration of the data throughput of the individual data streams can be avoided.

DETAILED DESCRIPTION OF THE INVENTION

An embodiment of the present invention for implementing the "virtual system operation" in a DAB system is described below. This embodiment can also be implemented using other line systems or wireless systems for transmitting data.

Figure 1:
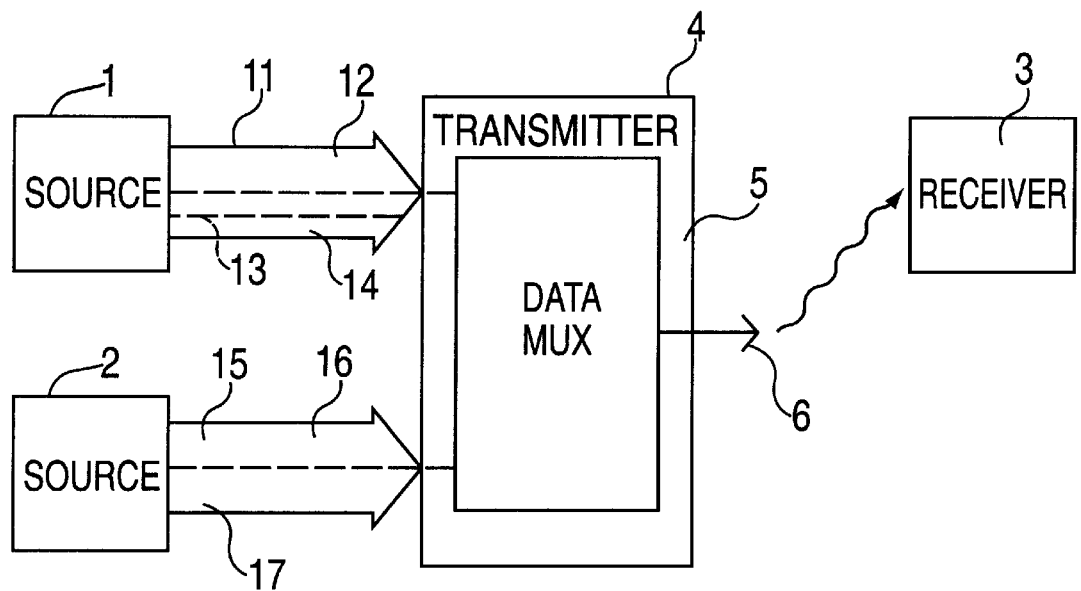
FIG. 1 shows an exemplary embodiment for carrying out the process according to the present invention.

The starting point in the following discussion is a configuration according to FIG. 1, for example, including a transmitter 4 with a data multiplexer 5 which receives one or more data streams 12, 13, 14 and 16 and 17 with individual data throughputs from one or more sources 1, 2. The data streams are received over data channels. A fixed total data throughput 11, 15 is assigned to each source for a certain period of time. In the case of the DAB system, the transmitter corresponds to the system operator, the sources correspond to the program providers, for example, and the data streams correspond to the different programs or data services of the program providers. The multiplexer of the transmitter has the function of allocating the data in frame-oriented transmission, for example, to a suitable data package, which corresponds to a certain program or data service, for example. The data frames sent out by the transmitter are received by one or more receivers and demultiplexed, with the various data packages of one frame being allocated to the various programs again, and then analyzed.

Figure 2:
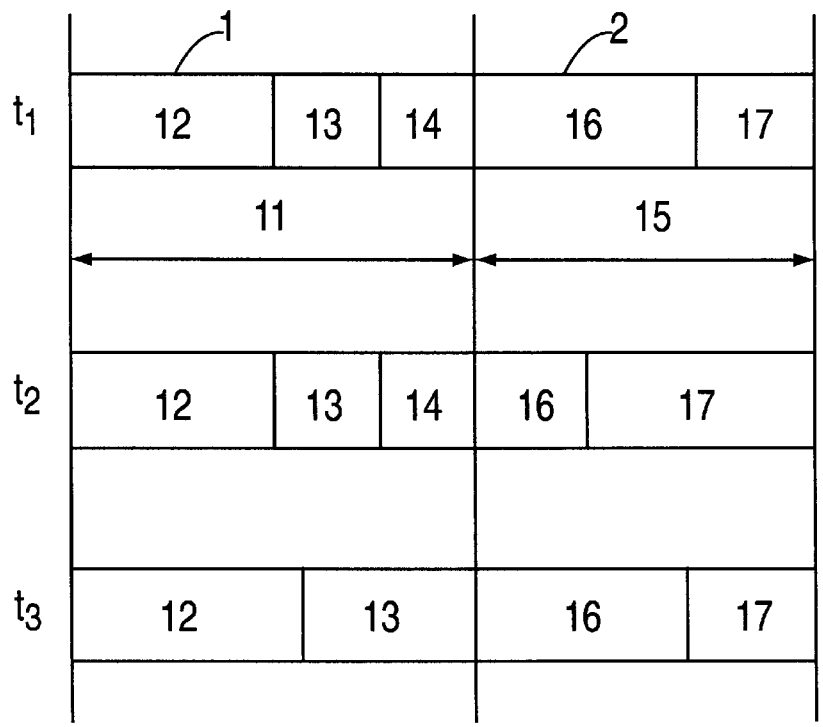
FIG. 2 shows an example of the distribution of the available transmission capacity between two sources at three different times according to an embodiment of the present invention.

FIG. 2 shows as an example of how the total transmission capacity 11, 15 which is allocated in a fixed manner to the two program providers 1, 2 is distributed among several programs and/or data services 12, 13, 14 and 16, 17 at three different times $t_1$, $t_2$ and $t_3$.

At time $t_1$ program provider 1 transmits three programs 12, 13, 14, each with a certain data throughput, and program provider 2 transmits the two programs 16 and 17. These programs may be partially or entirely data services. At time $t_2$ program provider 2 has reduced the data throughput of program 16 while at the same time increasing the data throughput of program 17. At time $t_3$ program provider 2 has switched the data throughput of programs 16 and 17 to the original data rates at time $t_1$, while program provider 1 has at the same time stopped program 14, so that with the help of the transmission capacity originally available for program 14, higher data throughputs can be achieved with programs 12 and 13.

The sequence of the process according to the present invention is described below with reference to FIG. 3.

To ensure satisfactory functioning of the receivers, they must be notified when there is a change in the data throughput of a program not only regarding the present and future allocation of transmission capacity but also the time (e.g., data frame number) after which the change is to go into effect. This notice goes over a separate information channel, but it can also be transmitted with the multiplex signal, for example. The notice of such a change must be made a certain period of time $d_1$ before the change goes into effect. Such a change affects not only the multiplexer of the transmitter, but also the data streams of the source which must be switched to their new data throughput simultaneously with the change in multiplex configuration.

The following problems must be overcome to accomplish the change in data throughout. First, it is necessary to guarantee that the sources of the program providers will be switched to the new data throughput at the proper time without requiring any return lines from the system operator to the providers. In addition, reconfiguration notices of two or more independent program providers received by the system operator in a shorter interval of time than $d_1$ must be handled without requiring that the individual program providers take each other into account.

For proper functioning of the process, it is presupposed that the multiplex signal is reconfigured by the system operator only at discrete times t[i], i=0, 1, 2, . . . at intervals $d_1$. Since the period of time $d_1$ amounts to only a few seconds with DAB, for example, this restriction is indispensable for practical applications. Synchronization of the program providers among themselves and with the system operator is dispensable when the program providers meet the requirement that they notify the system operator of a desired change in data throughput of one or more data streams and thus the desired reconfiguration of the multiplex signal a time period $d_1$ before the time when the change is to go into effect. Notice of the change in the data rate from the transmitter to the receiver takes place at time $t_i$. The change in data rate by the transmitter at the subsequent discrete time $t_{i+1}$ takes place precisely when the reconfiguration request of the respective source arrives at the transmitter in the period of time $t_{i-1}-d_2$ to $t_i-d_2$, where $d_2$ denotes system-related delays, such as the reaction time of the transmitter, the period of time for a correct change in source data rate and delays resulting from the scrambling of data in DAB, for example.

For the case when the time reference of the transmitter is known to the source, it is sufficient for satisfactory functioning of the process if the source reduces its data rate to the stated value at the latest a time period $d_1$ after the data rate reconfiguration notice. In the countermove, the data rate of another data stream of the same source may be increased at the earliest after the elapse of a time period $d_3$ (equal to $2d_1+d_2$) after the data rate reconfiguration notice.

Figure 3:
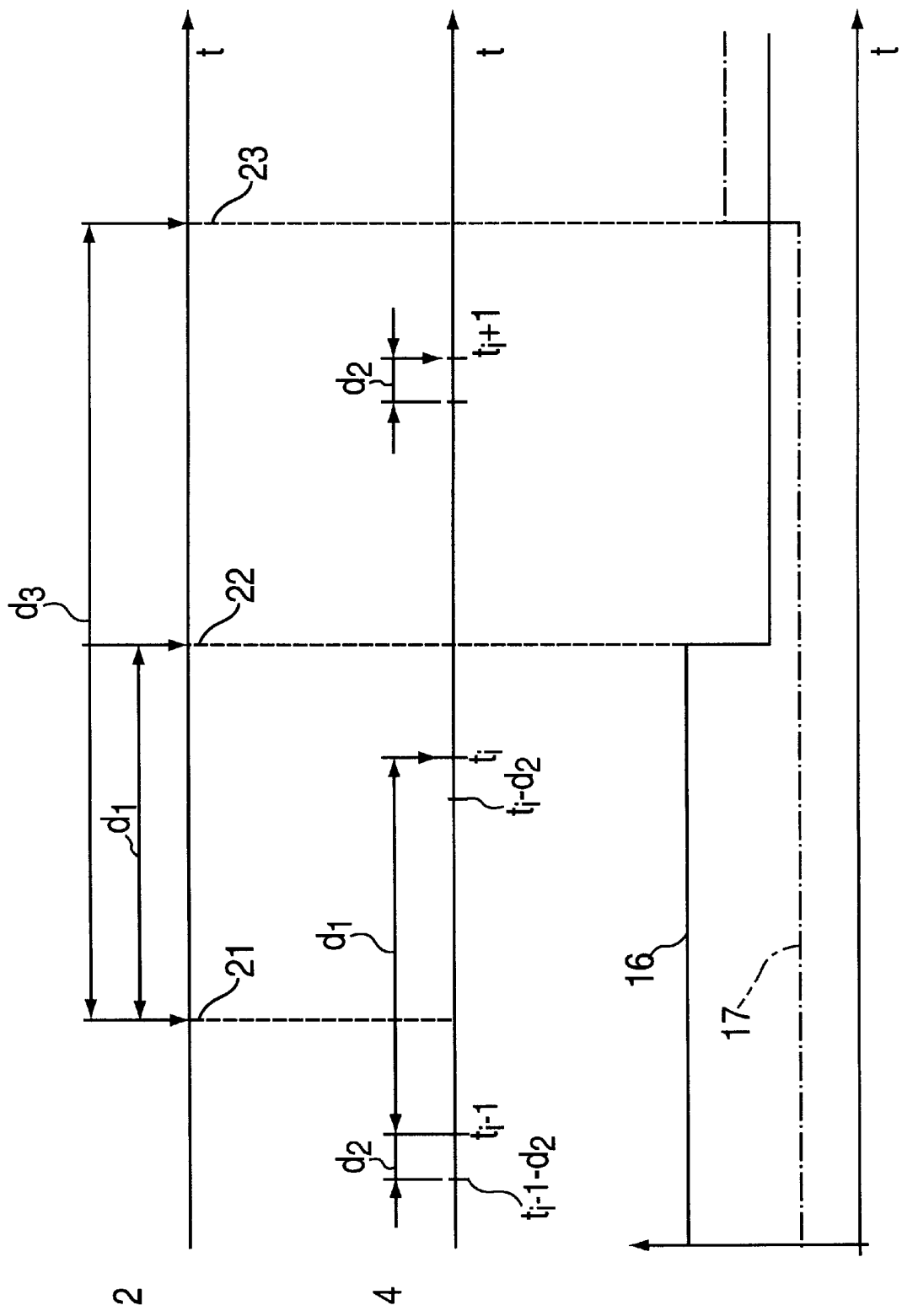
FIG. 3 shows an example of the time sequence of the process according to the present invention.

FIG. 3 shows an example of the sequence of the process according to the present invention. Program provider 2 wishes to change the data throughput of programs 16, 17, by reducing the data throughput of the first program 16 and increasing the data throughput of the second program 17. For this purpose, the program provider notifies the system operator of the desire to change the data throughput of the programs at time 21, which is within the interval from $t_{i-1}-d_2$ to $t_i-d_2$. According to the preceding discussion, this request for a change is relayed by the system operator to the receiver at the discrete time $t_i$ and the reconfiguration of the multiplex signal for adapting the multiplex to the revised data throughput of the program provider's programs is implemented at the discrete time $t_{i+1}$. According to the requirement that the reduction in data rate of a data stream on the part of the program provider must take place at the latest after a predefined time period $d_1$ has elapsed after the change request notice, the program provider reduces the data throughput of program 16 at a time 22 that is shifted by $d_1$ with respect to time 21. The data throughput of the second data stream 17 is increased at time 23, which is shifted by the time period $d_3=2d_1+d_2$ with respect to the notice of the change. The adjustment in data throughput of the programs by the program provider is shown in the bottom diagram in FIG. 3.

What is claimed is:

1. A method for transmitting data from a transmitter to at least one receiver, wherein the transmitter has a fixed time reference, the method comprising the steps of:

receiving multiple data streams from different sources, data throughputs of the multiple data streams being unequally distributed;

receiving, in the transmitter, a notice of a change in data throughput of a first data stream of the multiple data streams before a time of the change;

transmitting, from the transmitter, the notice of the change in data throughput with a next transmission section after receipt of the notice of the change;

reducing the data throughput no later than a predefined time period after receiving the notice, wherein the predefined time period is determined by the fixed time reference of the transmitter; and transmitting the multiple data streams from the different sources to the at least one receiver, wherein the notice of the change in data throughput is transmitted from a source of the different sources to the transmitter at least a second time period before a start of the next transmission section, wherein the second time period includes a sum of all system-related delays.

2. The method according to claim 1, wherein an increase in data throughput of a second data stream of the source of the different sources is made no earlier than a third time period after the notice of change of data throughput is transmitted from the source, wherein the third time period includes twice the predefined time period and the second time period.

3. The method according to claim 1, wherein the predefined time period is identified to the different sources.

4. The method according to claim 1, wherein the second time period is identified to the different sources.

* * * * *

UNITED STATES PATENT AND TRADEMARK OFFICE
CERTIFICATE OF CORRECTION

PATENT NO.   : 6,028,839
DATED        : February 22, 2000
INVENTOR(S)  : Juergen Hallier It is certified that error appears in the above-identified patent and that said Letters Patent is hereby corrected as shown below:

Column 2, line 57, change from "throughout" to - -throughput- -.

Signed and Sealed this

Seventeenth Day of April, 2001

Attest:

NICHOLAS P. GODICI

*Attesting Officer*   *Acting Director of the United States Patent and Trademark Office*